No. 644,407. Patented Feb. 27, 1900.
J. L. CREVELING.
AUTOMATIC REGULATION OF SYSTEMS OF ELECTRICAL DISTRIBUTION.
(Application filed Oct. 28, 1899.)
(No Model.)
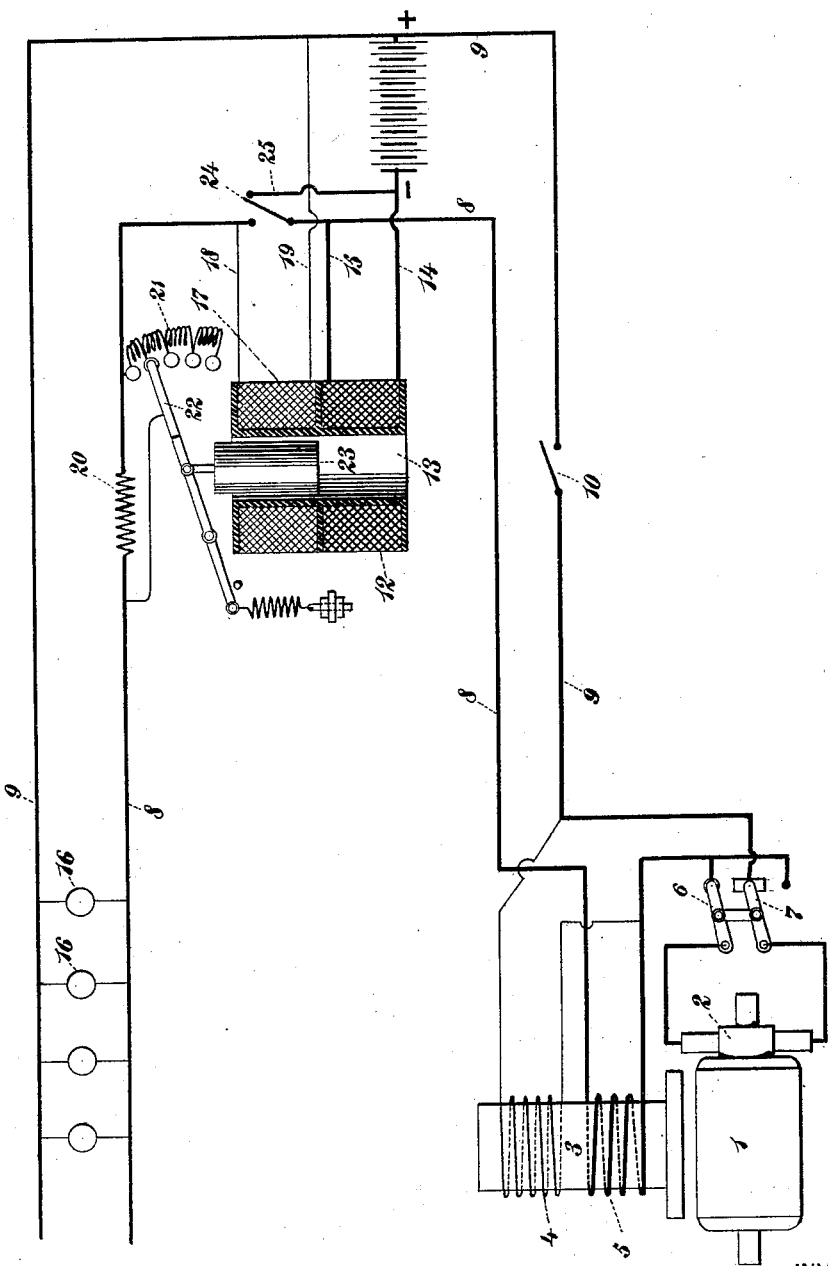
WITNESSES:
INVENTOR
John L. Creveling
BY Briesen & Knauth
ATTORNEYS

UNITED STATES PATENT OFFICE.

JOHN L. CREVELING, OF NEW YORK, N. Y.

AUTOMATIC REGULATION OF SYSTEMS OF ELECTRICAL DISTRIBUTION.

SPECIFICATION forming part of Letters Patent No. 644,407, dated February 27, 1900.

Application filed October 28, 1899. Serial No. 735,037. (No model.)

*To all whom it may concern:*

Be it known that I, JOHN L. CREVELING, a resident of the city of New York, borough of Manhattan, county and State of New York, have invented certain new and useful Improvements in the Automatic Regulation of Systems of Electrical Distribution, of which the following is a specification.

My invention relates to a system of electrical distribution, and has for its object to effect the automatic regulation of the work-circuit.

My invention will be described with reference to the accompanying drawing, which shows a system of electrical distribution embodying my invention, the same being a car-lighting system, but it will be understood that my invention is not limited thereto.

The object of my invention is to produce an electric-lighting system in which a generator and storage batteries are employed and in which resistance will be automatically switched into and out of the circuit of the translating devices to compensate for the increase or decrease of voltage of the generator necessary to charge the batteries, it being understood that owing to the internal resistance and varying counter electromotive force of the batteries during charging the electromotive force of the generator must be slightly greater than the counter electromotive force of the battery during charging or discharging the battery when the dynamo is in circuit. To effect this object, I provide an electromagnetic means to control the amount of resistance in the work or translation circuit, which electromagnetic means is governed by coils carrying currents which are obtained from circuits which will either assist or oppose each other, according to circumstances.

In the drawing, 1 is the generator, having the usual commutator 2 and field-magnet 3. This generator is shown as provided with a differential compound winding 4 5, the winding 4 being the normal shunt-winding and the winding 5 being the neutralizing-winding.

6 7 represent the pole-changing switch, and 8 9 the generator-mains, in one of which a main switch 10 is included. The storage battery is connected across the generator-mains 8 9 in the usual manner and has included in its circuit one coil 12 of an electromagnetic regulator 13, the said coil 12 being interpolated in the wires 14 15, the latter of which is connected to the main 8.

16 are the translating devices, which are in multiple with the mains 8 9 in the usual manner.

The electromagnetic regulator 13 is provided with a shunt-coil 17, which is connected in shunt across the lamp-circuit by the wires 18 19. Included in series with the main 8 is a resistance 20 and in shunt thereto a regulator comprising a variable resistance or rheostat 21, controlled by a movable arm 22, which is operated by the core 23 of the electromagnet 13. A suitable hand-switch 24 is provided for closing the lamp or work circuit, which switch may also coöperate with a contact-wire 25 for short-circuiting the winding 12 of the electromagnetic regulator 13 when the work-circuit is broken by said switch.

The operation of the system shown in the drawing is as follows: When the battery is delivering current to the lamp-circuit, the course of the current will be as follows: from the positive pole of the battery by wire 9, through the translating devices 16, back by the wire 8, dividing, part going through the resistance 20 and part through the variable resistance 21, thence to switch 24, wire 15, winding 12 of the electromagnetic regulator, and wire 14 to the negative pole of the battery, a current being also taken off by the derived circuit 18 17 19 through the coil 17. When the currents are flowing as thus indicated, the windings 12 and 17 oppose each other and the spring of the pivoted arm 22 holds the said arm in such position as to permit a maximum current to pass to the lamp by practically short-circuiting the resistance 20. If now the generator be started up, the current of the generator will oppose the passage of current from the battery through the coil 12, and the generator, being of higher voltage than the battery, will feed the lamps, and the battery will normally be charging while the generator is running, and the direction of flow of current in the coil 12 will be opposite to what it was when the battery alone was in circuit with the lamps. The coil 12 will thus assist the coil 17, thereby pulling down the core 23 of the electromagnetic regulator, and will switch in more and more of the resistance 21, so that the electromotive force on the lamp-circuit will be substantially sustained.

Having described my invention, what I claim, and desire to secure by Letters Patent, is—

1. In a system of electrical distribution, the combination of a generator, a storage battery in circuit therewith, a lamp-circuit into which both the generator and battery are adapted to deliver current and an electromagnetic regulator in the lamp-circuit for varying the resistance of and maintaining the potential of the said lamp-circuit substantially constant, comprising in its structure means for varying the resistance of the lamp-circuit and a plurality of windings acting thereon, one of the said windings being in shunt to the lamps and another of the said windings being connected to the lamp-circuit in series with the battery.

2. In a system of electrical distribution, the combination of the following instrumentalities in operative relation, to wit: a generator, a storage battery in circuit therewith, a lamp-circuit and an electromagnetic regulator for the said lamp-circuit comprised in part by a winding in series with the battery and in multiple with the generator, wherein the battery and generator electromotive forces oppose each other.

3. In a system of electrical distribution, the combination of the following instrumentalities in operative relation, to wit: a generator, a storage battery and a lamp-circuit and an electromagnetic regulator for the said lamp-circuit comprised in part by a plurality of windings, one of the said windings being normally in shunt relation to the lamp-circuit and the other of the said windings being normally in series with the battery, the said battery and winding being in multiple with the generator-circuit.

4. In a system of electrical distribution, the combination of a generator, a storage battery in circuit therewith, a lamp or consumption circuit into which both the generator and battery are adapted to deliver current, a variable resistance in the lamp or consumption circuit and electromagnetic means connected to the generator-main circuit and to the battery for increasing the resistance in the lamp or consumption circuit upon a decrease of current from the battery to the lamp or consumption circuit.

JOHN L. CREVELING.

Witnesses:
GEO. E. MORSE,
MAURICE BLOCK.